United States Patent [19]

Imura

[11] Patent Number: 5,940,745
[45] Date of Patent: *Aug. 17, 1999

[54] PORTABLE TRANSCEIVER HAVING RETRACTABLE ANTENNA AND MATCHING CIRCUIT

[75] Inventor: Minoru Imura, Tokyo, Japan

[73] Assignee: NEC Corporation, Tokyo, Japan

[ * ] Notice: This patent is subject to a terminal disclaimer.

[21] Appl. No.: 08/216,025

[22] Filed: Mar. 21, 1994

[30] Foreign Application Priority Data

Mar. 24, 1993 [JP] Japan ................................. 5-064943

[51] Int. Cl.⁶ ............................. H01Q 1/24; H04B 1/40
[52] U.S. Cl. ........................ 455/90; 455/550; 455/129; 455/290; 343/702; 343/750; 343/901
[58] Field of Search ................................ 455/89, 90, 129, 455/269, 280, 290, 291, 292, 550; 343/702, 749, 856, 895, 718, 720, 723, 750, 791, 889, 900, 901; H01Q 1/24, 9/32

[56] References Cited

U.S. PATENT DOCUMENTS

| | | |
|---|---|---|
| 4,860,024 | 8/1989 | Egashira . |
| 4,890,114 | 12/1989 | Egashira . |
| 5,204,687 | 4/1993 | Elliott et al. .............................. 343/702 |
| 5,317,325 | 5/1994 | Bottomley ................................. 343/895 |
| 5,374,937 | 12/1994 | Tsunekawa et al. ..................... 343/895 |
| 5,521,605 | 5/1996 | Koike ....................................... 343/702 |

FOREIGN PATENT DOCUMENTS

| | | | |
|---|---|---|---|
| 0516490 | 12/1992 | European Pat. Off. ......... | H01Q 1/24 |
| 5315822 | 11/1993 | Japan .............................. | H01Q 1/24 |
| 2235588 | 3/1991 | United Kingdom . | |

OTHER PUBLICATIONS

Japanese Office Action dated Feb. 2, 1998.

*Primary Examiner*—Reinhard J. Eisenzopf
*Assistant Examiner*—Lester G. Kincaid
*Attorney, Agent, or Firm*—Whitham, Curtis & Whitham

[57] ABSTRACT

In a portable radio communication apparatus, a matching circuit is electrically connected to an antenna when the antenna is retracted into a casing. In this condition, the antenna and a feed circuit are matched as desirably as when the antenna is extended from the casing.

7 Claims, 4 Drawing Sheets

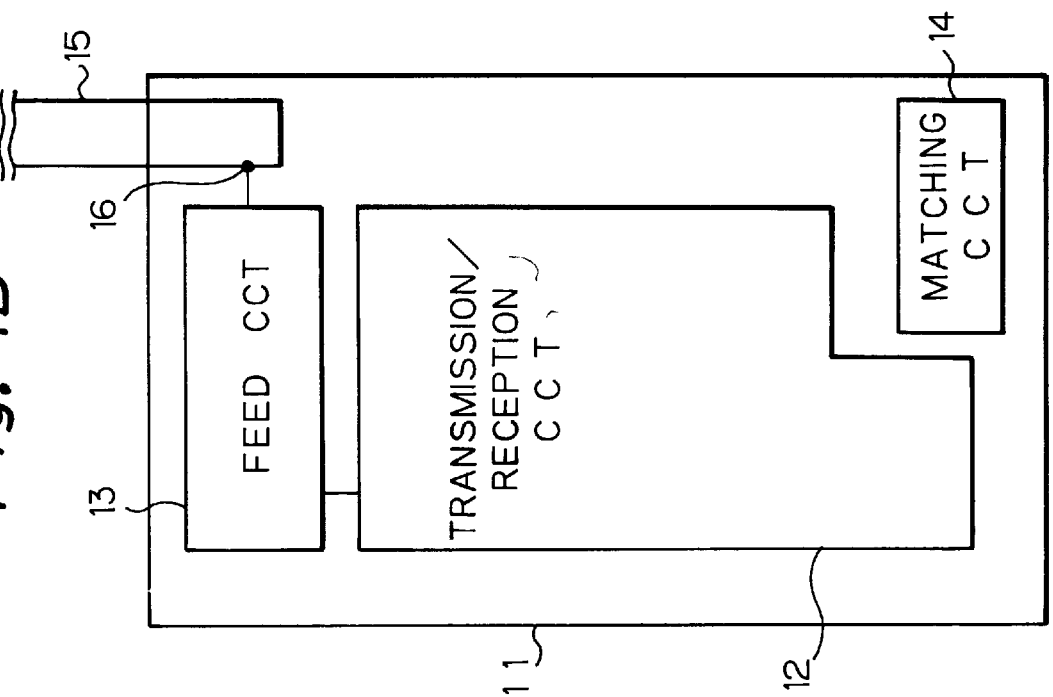
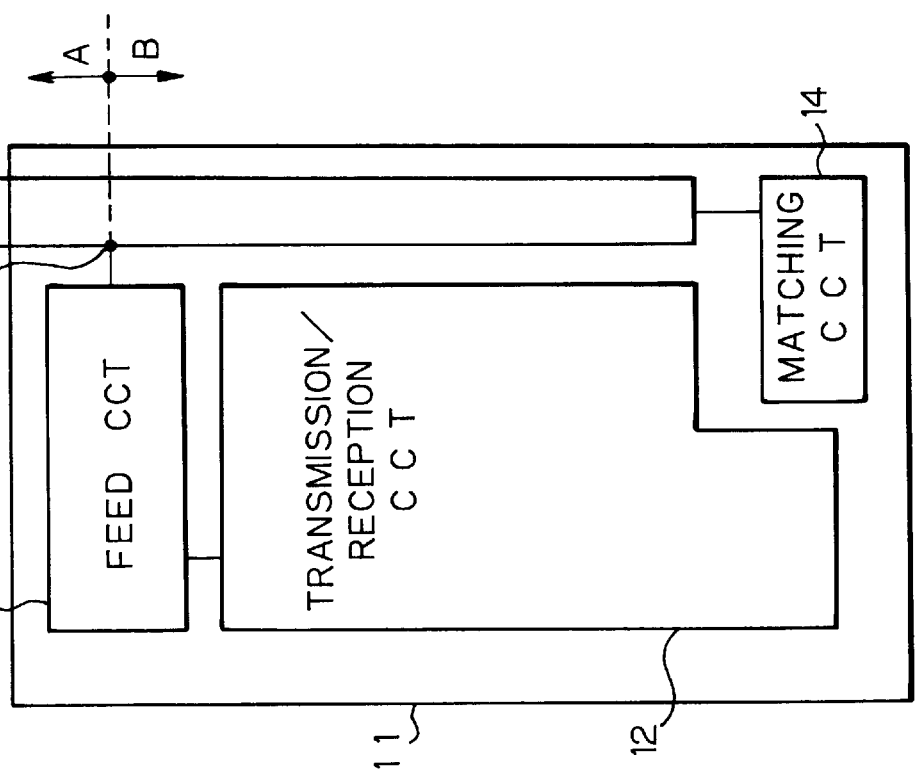

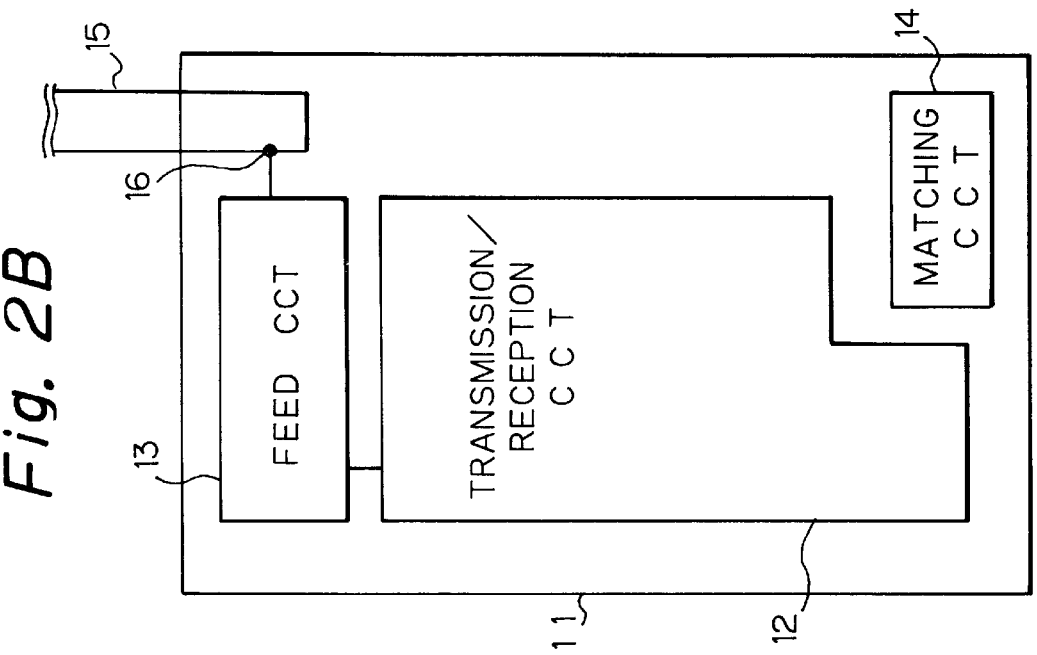
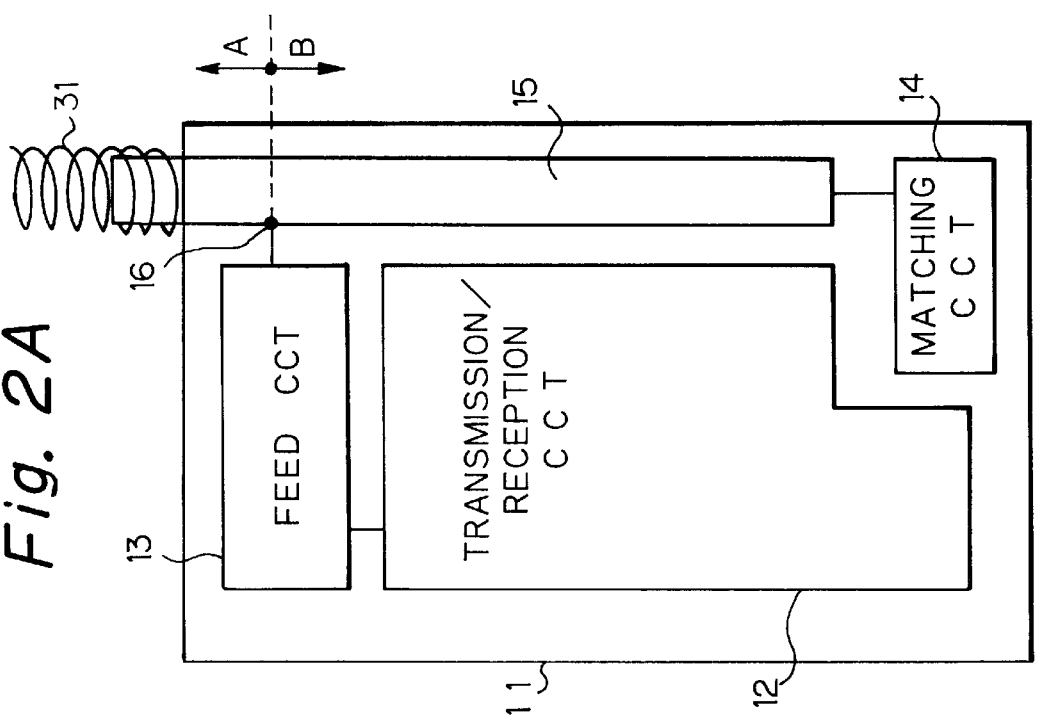

PORTABLE TRANSCEIVER HAVING RETRACTABLE ANTENNA AND MATCHING CIRCUIT

BACKGROUND OF THE INVENTION

The present invention relates to an improvement in a cordless telephone, transceiver, or similar portable radio communication apparatus.

Today, a portable radio communication apparatus of the kind described is often put in the user's bag or even in a pocket by virtue of remarkable miniaturization. Usually, this kind of apparatus has a casing and an antenna retractably mounted on the casing. The antenna is retracted into the casing when the apparatus is simply carried by the user or extend from the casing when the apparatus is to be used. Hence, when the apparatus is waiting for an incoming call, the antenna is, in many cases, retracted in the casing. This brings about a problem that the antenna in the retracted position cannot attain a sufficient antenna characteristic, reducing the transmission/reception range to a critical degree. What is important, therefore, is to enhance the antenna characteristic when the antenna is held in the retracted position.

On the other hand, it has been customary with the apparatus of the kind described to match the antenna and a feed circuit by a matching section, which is included in the feed circuit, such that an optimal condition is set up when the antenna is extended from the casing. It follows that in the retracted position, the antenna and the feed circuit cannot be matched, noticeably degrading the antenna characteristic. As a result, the apparatus is prevented from performing communication stably.

SUMMARY OF THE INVENTION

It is, therefore, an object of the present invention to provide a portable radio communication apparatus capable of matching, when an antenna is retracted into a casing, an antenna and a feed circuit as desirably as when the antenna is extended from the casing, thereby enhancing the antenna characteristic.

A portable radio communication apparatus of the present invention comprises a transmission/reception circuit, a casing accommodating the transmission/reception circuit, an antenna mounted on, and retractable into, the casing, a feed circuit accommodated in the casing for electrically connecting the antenna and transmission/reception circuit, and a matching circuit accommodated in the casing and connectable to the antenna when the antenna is retracted into the casing.

BRIEF DESCRIPTION OF THE DRAWINGS

The above and other objects, features and advantages of the present invention will become more apparent from the following detailed description taken with the accompanying drawings in which:

FIG. 1A shows a first embodiment of the radio communication apparatus in accordance with the present invention in a condition wherein an antenna is retracted into a casing;

FIG. 1B shows the first embodiment in a condition wherein the antenna is extended from the casing;

FIG. 2A shows a second embodiment of the present invention in a condition wherein an antenna is retracted into a casing;

FIG. 2B shows the second embodiment in a condition wherein the antenna is extended from the casing;

DESCRIPTION OF THE PREFERRED EMBODIMENTS

Figure 3A:
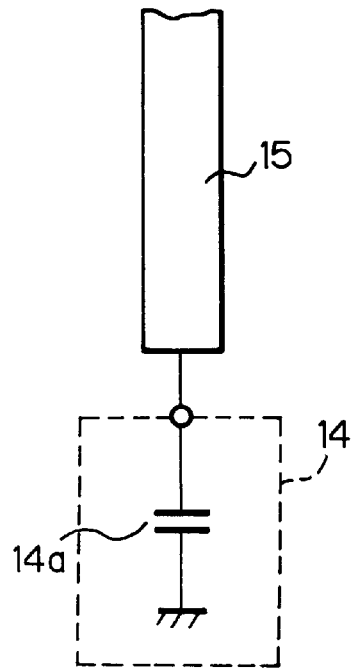
FIGS. 3A and 3B each shows a specific configuration of a matching circuit included in the embodiments.

Referring to FIGS. 1A and 1B of the drawings, a first embodiment of the portable radio communication apparatus in accordance with the present invention is shown and includes a casing 11. A transmission/reception circuit 12, a feed circuit 13, and a matching circuit 14 are accommodated in the casing 11. An antenna element, or simply antenna, 15 is mounted on and retractable into the casing 11.

As shown in FIG. 1A, when the antenna 15 is retracted into the casing 11, it is electrically connected to the feed circuit 13 at a feed point 16 and, therefore, connected to the transmission/reception circuit 12 via the feed circuit 13. The lower end of the antenna 15 is electrically connected to the matching circuit 14. In this condition, the matching circuit 14 opens the impedance from the feed circuit 13 to the direction of the antenna 15 indicated by an arrow B with respect to the frequency assigned to the radio apparatus. Also, a matching section, not shown, included in the feed circuit 13 adjusts the impedance from the feed circuit 13 to the direction of the antenna 15 indicated by an arrow A to an adequate characteristic impedance, e.g., 50 Ω. With this configuration, the radio apparatus is free from the influence of the antenna 15 in the direction B and, therefore, operable in a stable manner even when the antenna 15 is retracted into the casing 11.

As shown in FIG. 1B, when the antenna 15 is extended from the casing 11, it is not electrically connected to the matching circuit 14 although it is electrically connected to the feed circuit 13 at the feed point 16. In this condition, the matching section of the feed circuit 13 adjusts the impedance from the feed circuit 13 to the antenna 15 to an adequate characteristic impedance, e.g., 50 Ω.

A reference will be made to FIGS. 2A and 2B for describing a second embodiment of the present invention. In FIGS. 2A and 2B, the same or similar constituent parts as the parts of FIGS. 1A and 1B are designated by the same reference numerals, and a detailed description thereof will not be made in order to avoid redundancy. As shown, this embodiment is similar to the previous embodiment except that a conductor in the form of a coil 31 is connected to the antenna 15. The matching circuit 14 opens the impedance from the feed circuit 13 to the direction B of the antenna 15 with respect to the assigned frequency, as in the first embodiment. Regarding the impedance from the feed circuit 13 to the direction A of the antenna 15, the matching section of the feed section 13 adjusts it to an adequate characteristic impedance, e.g., 50 Ω.

Figure 3B:
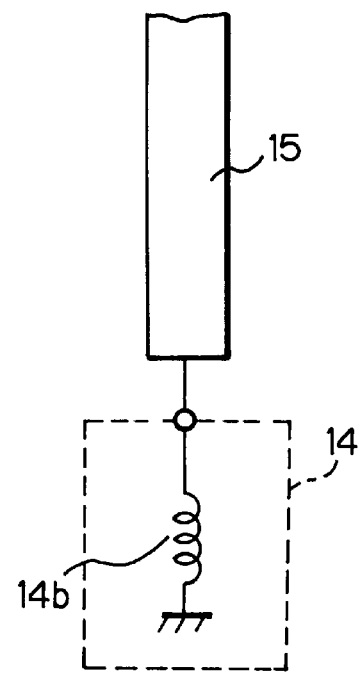

FIGS. 3A and 3B each shows a specific configuration of the matching circuit 14 included in both of the first and second embodiments. As shown, the matching circuit 14 may be implemented by a capacitor 14a, as shown in FIG. 3A, or by an inductor 14b, as shown in FIG. 3B.

Figure 4A:
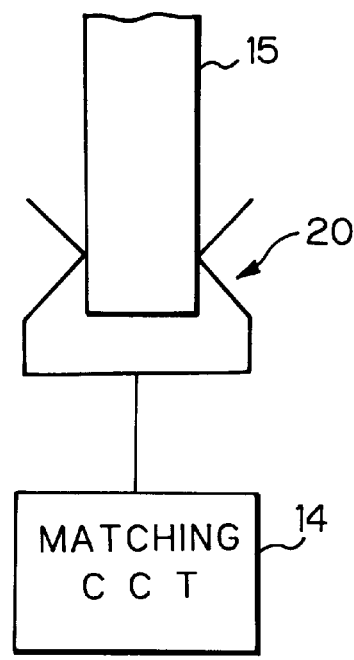
FIGS. 4A and 4B each shows specific means for connecting the antenna and matching circuit included in the embodiments.
Figure 4B:
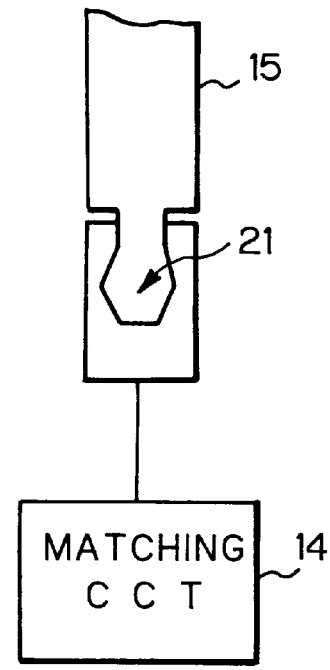

FIGS. 4A and 4B each shows specific means for connecting the matching circuit 14 and antenna 15 also included in the embodiments. FIG. 4A shows connecting means 20 provided on the matching circuit 14. The connecting means 20 is so configured as to nip the lower end of the antenna 15 when the antenna 15 is retracted into the casing 11. FIG. 4B shows connecting means 21 which is provided on the lower end of the antenna 15.

Figure 5A:
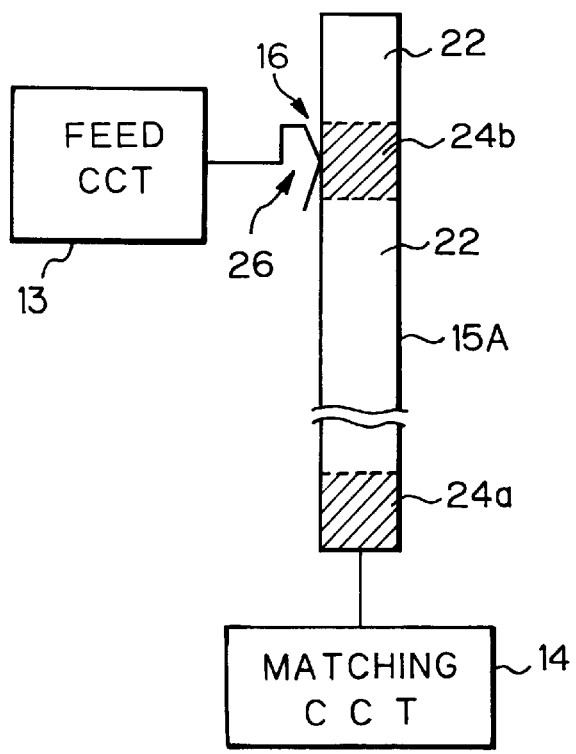
FIGS. 5A–5C each shows a specific configuration of the antenna included in the embodiments and specific means for connecting the antenna and a feed circuit at a feed point.
Figure 5B:
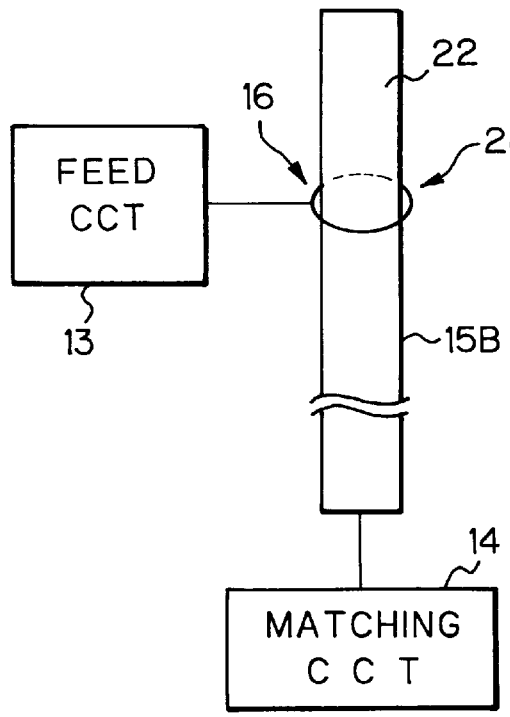
Figure 5C:
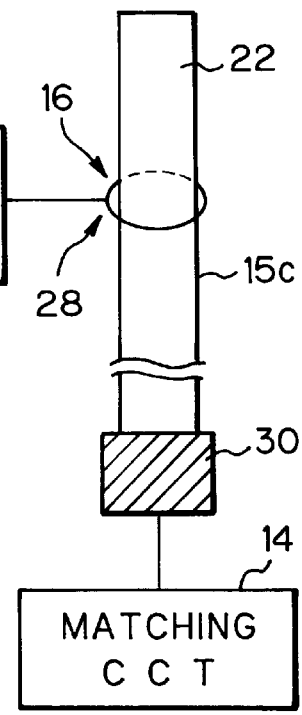

Referring to FIGS. 5A–5C, there will be described specific configurations of the antenna 15 and specific means for connecting the antenna 15 and feed circuit 13 at the feed point 16.

FIG. 5A shows an antenna 15A which is implemented by a conductive rod and covered with an insulator except for a part thereof. Specifically, the antenna 15A has insulated surface portions 22 and conductive surface portions 24a and 24b alternating with each other. Connecting means 26 is connected to the feed circuit 13 and constituted by, for example, a resilient contact member made of metal. When the antenna 15A is retracted into the casing 11, the conductive surface portion 24a is brought into contact with the matching circuit 14. At the same time, the other conductive portion 24b is connected to the contact member 26 at the feed point 16.

FIG. 5B shows an antenna 15B whose surface is entirely covered with an insulator. In this case, therefore, connecting means 28 is implemented as a metallic member which does not contact the antenna 15B.

Further, FIG. 5C shows an antenna 15C which is essentially similar to the antenna 15B except that a conductive member 30 is carried on the lower or innermost end of the antenna 15C. In this configuration, when the antenna 15C is extended from the casing 11, the conductive member 30 is brought into contact with the metallic member 28.

In summary, it will be seen that the present invention provides a portable radio communication apparatus which enhances, when an antenna thereof is held in a retracted position, the antenna gain and performs communication stably. This unprecedented advantage is derived from a unique matching circuit which is electrically connected to the antenna when the antenna is retracted into a casing.

Various modifications will become possible for those skilled in the art after receiving the teachings of the present disclosure without departing from the scope thereof.

What is claimed is:

1. A rod antenna having a matched gain in both an extended position and in a retracted position, comprising:

a rod antenna slidabley mounted within a casing, said rod antenna having an outer surface portion, a lower end, and an upper end;

feed means, positioned along said outer surface of said rod antenna, for providing an electrical feed to said rod antenna as said rod antenna slides relative to said feed means;

impedance matching means, positioned to electrically contact said lower end of said rod antenna only when said rod antenna is in said retracted position, for putting a matching impedance in series with said rod antenna from said feed means to electrical ground.

2. A rod antenna having a matched gain as recited in claim 1 wherein said feed means matches impedance of said rod antenna from said feed means to said upper end when said rod antenna is in both the retracted position and in the extended position.

3. A rod antenna having a matched gain as recited in claim 1 wherein the upper end of said rod antenna comprises a coil.

4. A rod antenna having a matched gain as recited in claim 1 wherein said impedance matching means comprises a capacitor connecting said lower end of said rod antenna to electrical ground.

5. A rod antenna having a matched gain as recited in claim 1 wherein said impedance matching means comprises an inductor connecting said lower end of said rod antenna to electrical ground.

6. A rod antenna having a matched gain as recited in claim 1 wherein said outer surface portion of said rod antenna comprises insulated portions and at least a first and a second non-insulated portion, and wherein, when said antenna rod in the extended position said feed means comprises a resilient member adapted to contact said first non-insulated portion, and when said rod antenna is in the retracted position said resilient member of said feed means contacts said second non-insulated portion.

7. A rod antenna having a matched gain as recited in claim 1 wherein said rod antenna is covered with an electric insulator and said feed means comprises a conductive loop co-axial with said rod antenna.

* * * * *